United States Patent [19]

Allen

[11] 4,373,040

[45] Feb. 8, 1983

[54] EPOXY MOLDING COMPOUND

[75] Inventor: Richard B. Allen, Dalton, Mass.

[73] Assignee: General Electric Company, Pittsfield, Mass.

[21] Appl. No.: 270,914

[22] Filed: Jun. 5, 1981

[51] Int. Cl.³ .............................................. C08L 63/00
[52] U.S. Cl. ..................................... 523/466; 523/400
[58] Field of Search ............... 260/37 EP; 528/88, 89, 528/90, 91, 92; 523/466, 400

[56] References Cited

U.S. PATENT DOCUMENTS

| | | | |
|---|---|---|---|
| 3,708,296 | 1/1973 | Schlesinger | 96/33 |
| 4,138,255 | 2/1979 | Crivello | 96/35.1 |
| 4,173,551 | 11/1979 | Crivello | 260/18 EP |
| 4,216,288 | 8/1980 | Crivello | 430/280 |
| 4,283,312 | 8/1981 | Crivello | 260/18 EP |
| 4,308,118 | 12/1981 | Dudgeon | 260/37 EP |

OTHER PUBLICATIONS

Ledwith, A., "Formation and Reactivites of Free Ions in Cationic Polymerization", Pure & Appl. Chem., 51, 159–171, (1979).

Ledwith, A., "Possibilities for Prom. Cationic Polymerization by Common Sources of Free Radicals" Polymer, 19, 1217–1218, (1978).

Abdal-Rasoul et al., "Photochemical & Thermal Cationic Polymerizations Promoted by Free Radical Initiators" Polymer, 19, 1219–1222, (1978).

Primary Examiner—Lewis T. Jacobs
Attorney, Agent, or Firm—Hedman, Casella, Gibson & Costigan

[57] ABSTRACT

An improved molding compound is described. The compound includes:
(a) from about 5 to 90% by weight of curable epoxy resin;
(b) from about 0.01 to 10% by weight of an aromatic onium salt of the formula:

$$[R_a X]_b^+ [C]^{-b}$$

wherein each R is a monovalent organic aromatic radical; X is selected from the group consisting of sulfur and iodine; C is a lewis acid polymerization catalyst precursor; a equals the absolute value of the valence number of (X minus 1); and b equals the absolute value of the valence number of C;
(c) from about 0.01 to 10% by weight of peroxide compound effective to activate said catalyst; and
(d) from about 10 to 95% by weight of filler, based on the total weight of the composition.

These molding compounds exhibit both superior curing rates and storage stability.

7 Claims, No Drawings

EPOXY MOLDING COMPOUND

BACKGROUND OF THE INVENTION

Epoxy resins have generally been employed in a variety of applications requiring high performance materials. Catalytic cure of an epoxy resin can often be accomplished in a "one package" system. Preferred such systems have been based on the employment of a lewis acid catalyst in the form of an amine complex such as boron trifluoridemonoethyl amine. The lewis acid is released on heating; cure takes place within 1 to 8 hours and can require a temperature of 160° C. and higher. Due to the temperatures required, these one package epoxy compositions cannot be employed in conjunction with heat sensitive devices. Nor can epoxy monomers having low boiling points be used due to the resulting losses to evaporation during cure. Consequently, improved systems are desirable.

As shown by Schlesinger, U.S. Pat. No. 3,708,296, certain photosensitive aromatic diazonium salts can be employed to cure epoxy resins. When photolyzed, these aromatic diazonium salts are capable of releasing, in situ, a lewis acid catalyst which can initiate the rapid polymerization of the epoxy resin. However, even though these one package epoxy resin mixtures can provide fast curing compositions, a stabilizer must be used to minimize cure in the dark during storage of these mixtures. Despite the measures, gellation of the mixture can occur even in the absence of light. In addition, nitrogen is released during UV-cure, which can result in film imperfections. Diazonium salts are generally unstable, rendering the use of such materials hazardous because of the possibility of run-away decomposition.

U.S. Pat. No. 4,138,255 of Crivello described yet another catalyst system. It employs radiation sensitive aromatic onium salts of the formula:

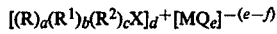

wherein R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; X is a Group VIa element selected from sulfur, selenium and tellurium; M is a metal or metalloid; Q is a halogen radical; a is a whole number equal to 0 to 3 inclusive; b is a whole number equal to 0 to 2 inclusive; c is a whole number equal to 0 to 1; where the sum of a+b+c is a whole value equal to 3 or the valence of X; d=e−f; f=valence of M and is an integer equal to from 2 to 7, inclusive; and e is >f and is an integer having a value up to 8. These catalysts are ordinarily activated by radiant energy such as an electron beam or ultraviolet light.

Further improvements in this basic Crivello patent are described by the inventor in U.S. Pat. Nos. 4,173,551 and 4,216,288 as well as application Ser. No. 152,424 filed May 22, 1980 now U.S. Pat. No. 4,329,306, issued May 11, 1982. Therein, a cocatalyst such as an organic acid or copper salt is employed with an onium salt. This combination catalyst produces a more stable one package epoxy system at ambient temperature which is nonetheless readily activatable.

In Appln. Ser. No. 176,723 filed Aug. 8, 1980 of Dudgeon, a still further improvement to the basic Crivello patent is described. Therein, onium salts are employed in conjunction with a peroxide compound. This combination again allows thermal activation of a storage stable epoxy system.

The foregoing patents and applications deal chiefly with epoxy systems useful for coatings, laminants, varnishes, sealants and the like. In addition to those uses, epoxy systems which can be utilized as molding compounds are known and are of particular importance. Such molding compounds should be activatable for rapid cure and are especially dependent upon storage stability.

DESCRIPTION OF THE INVENTION

The polymerization initiator of the present epoxy molding compounds is a radiation sensitive onium salt having the formula:

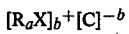

wherein each R is a monovalent organic aromatic radical; X is selected from the group consisting of sulfur and iodine; C is a lewis acid polymerization catalyst precursor; a equals the absolute value of the valence number of (X minus 1); and b equals the absolute value of the valence number of C. It is combined with an amount of a peroxide compound effective to activate the polymerization initiator.

Suitable aromatics for R in this formula are, for example, $C_{(6-13)}$ hydrocarbons radicals as phenyl, tolyl, naphyl and anthryl or heterocyclic radicals such as pyridyl and furfuryl. In addition, these aromatic radicals may be substituted with up to 1 to 4 monovalent radicals including $C_{(1-8)}$ alkoxy, $C_{(1-8)}$ alkyl, nitro, halo and hydroxy radicals. While different R radicals may be present in a given salt, ordinarily they are identical.

C in this formula may be a Lewis Acid catalyst for the polymerization of epoxy resins. They are well-known and primarily include halides of transition or rare earth metals or of metalloids. Representative are $BF_4^-$, $PF_6^-$, $FeCl_4^-$, $BiCl_4^{-2}$, $SnCl_6^-$, $AlF_6^{-3}$, $GaCl_4^-$, $InF_4^-$, $TiF_6^{-2}$, and $ZrF_6^-$. Particularly preferred are $AsF_6^-$ and $SbF_6^-$.

Onium salts of the present invention are well known. They can be made by the procedures shown in J. W. Knapcayk and W. E. McEwen, J. Am. Chem. Soc. 91 145 (1969); A. L. Maycock and G. A. Berchtold, J. Org. Chem. 35, No. 8, 2532 (1970); H. M. Pitt, U.S. Pat. No. 2,807,648; E. Groethals and P. De Badzctzky, Bul. Soc. Chem. Bleg., 73 546 (1964); H. M. Leicester and F. W. Berstrom, J. Am. Chem. Soc. 51 3587 (1927).

These initiators may be produced by combination of an onium salt of a strong acid anion (such as $Cl^-$, $HSO_4^-$ or $NO_3^-$) with a lewis acid salt of a strong basic cation (such as $Na^+$ or $NH_4^+$). As a result, the initiator may even be produced in situ within the epoxy resin composition to be polymerized.

The present compositions must also include a peroxide compound effective to activate the polymerization catalyst. Ordinarily, an organic peroxide such as butyl perbenzoate, dicumyl peroxide or the like is employed. These peroxides are desirably essentially stable up to at least 50° and more preferably 100° C. This ensures their presence when polymerization is induced through exposure to still higher temperatures.

The amount of peroxide compound in the present compositions is not critical so long as enough to activate the polymerization initiator is present. Ordinarily, the peroxide is present in molar amounts at least equal to the initiator. Often a 2–3 fold molar excess of phenoxide is desirable. More then a 10 fold molar excess of initiator is usually avoided.

The compositions of the present invention are normally further admixed with (if not produced within) a curable epoxy resin. This may be done shortly prior to thermal activation. Because of their stability, they may also be admixed and then stored for considerable periods of time before actual activation and use.

Those "curable epoxy resins" suitable for use in accordance with the present invention include any monomeric, dimeric or oligomeric or polymeric epoxy material containing one or a plurality of epoxy functional groups. For example, those resins which result from the reaction of bisphenol-A (4,4′-isopropylidenediphenol) and epichlorohydrin, or by the reaction of low molecular weight phenol-formaldehyde resins (Novolac resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl arylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl arylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81 632–5 (1959). As described in the literature, epoxy resins can also be modified in a number of standard ways such as reactions with amines, carboxylic acid, thiols, phenols, alcohols, etc. as shown in U.S. Pat. Nos. 2,935,488; 3,235,620; 3,369,055; 3,379,653; 3,398,211; 3,403,199; 3,567,797; 3,677,995; etc. Further examples of epoxy resins which can be used are shown in the Encyclopedia of Polymer Science and Technology, Vol. 6, 1967, Interscience Publishers, New York, pp 209–271.

The curable epoxy resin should be present in an amount of from about 5 to 90%, preferably 5 to 50%, by weight of the molding compound. In contrast, the onium salt and peroxide compound employed should each be present in from 0.01 to 10% by total weight and preferably represent a total of from 1 to 15% by weight based on epoxy.

The present molding compounds should contain from about 10 to 95% filler by total weight. More preferably, from about 50 to 95% filler is utilized. This optimizes the advantages of the present invention.

The fillers of the present invention are generally chemically inert. They ordinarily will not react with any of the epoxy resins, peroxide compounds or other components. They instead function by stabilizing the physical properties of the molding compound, particularly during and after resin cure.

Any conventional filler may be utilized in the present compositions. Representative fillers include: clays, like kaolin and calcined clays; silica, like novaculities, ground sand and amorphous glass; mica; talc; carbon black; alumina; and wollastonite. Alternatively or in addition, a structural filler may be employed. These fillers include such fibrous materials as glass fiber, mineral wool and the like which may provide enhanced product strength.

So long as the present molding compounds have not yet been activated, they remain quite stable. Therefore, at or below a temperature of from about 50° to 100° C. (depending upon the particular initiator and peroxide present) no significant polymerization or curing occurs.

In utilizing the present compositions, conventional techniques may be employed. For example, a solid composition may be compression or transfer molded while a liquid one is normally injection or pultrusion molded. While under molding pressure, the composition should be heated, generally to from about 50° to 200° C. Under these conditions, curing occurs in minutes. Molded articles having virtually any configuration or size may be formed.

The present invention will be more completely understood from the following examples. They are provided by way of illustration, and not limitation, of its scope. Unless otherwise indicated therein, all proportions are by weight.

EXAMPLE I

Comparative sample molding compounds are made by dissolving 2.5 grams of diphenyliodonium hexafluoroarsenate in 100 grams of bisphenol A diglycidyl ether epoxy resin (EPON 828 of Shell Chemical Company) at 60° C. under mechanical agitation. Threafter, at room temperature, 2.5 grams of dicumyl peroxide are added.

To one of the two samples (Sample B) is then added 100 grams of crystalline silica of 325 mesh and 50 grams of milled glass fibers. This represents a filled, and Sample B an unfilled, composition.

The separate samples are injected into a disc-shaped compression molded and heated at 175° C. for three minutes. The resultant molded articles are then tested to allow comparison of their properties.

Hot Rigidity

Immediately upon demolding, the hot molded discs are suspended from their edges on a frame and a 1 kg. weight placed on their centers. Sample A (no filler) breaks. Filled Sample B shows a deflection of 30 mils; this indicates sufficient stiffness when hot to allow easy demolding under commercial processing conditions.

Linear Shrinkage

Comparison of the largest dimensions of discs molded from Samples A and B with the cooled mold dimension shows shrinkages of the discs. That for Sample A is 30 mils/inch; that for Sample B, 13 mils/inch. The decrease in shrinkage of Sample B reflect the increased stability and uniformity imparted to a molding compound by filler.

Part Appearance

Visual inspection of the disc molded from Sample B reveals a smooth and even surface. In contrast, that molded from Sample A (no filler) is pitted with large voids, making it unsuitable for use.

EXAMPLE II

The following are mixed together for 10 minutes under vacuum in a Ross planetary mixer:

| | |
|---|---|
| 950 grams | bisphenol A diglycidyl ether of epoxy resin (EPON 828) |
| 50 grams | epoxy resin (EPON 871) |
| 40 grams | diphenyl iodonium hexafluoroarsenate in 3:1 admixture with propylene carbonate |
| 25 grams | 2,5-dimethyl - 2,5- (t-butylperoxy) hexane |
| 1000 grams | silica |
| 500 grams | milled glass fiber |

This resultant molding compound is liquid and remains stable for over 8 months at room temperature.

The molding compound is cured in a disc-shaped mold heated at 175° C. for 3 minutes. The ⅛ inch thick molded disc has the following properties:

| | |
|---|---|
| Flex Strength | 10,900 psi |
| Flex Modulus | 1.38 × 10⁶ psi |
| Gardner Impact | 6.25 in/lb. |

These are satisfactory for a molding compound.

EXAMPLE III

The process of Example I, Sample B is repeated except t-butyl peracetate is utilized instead of dicumyl peroxide. The resultant composition has a gel time of 1.0 minute at 175° C. using a standard gel plate test. This indicates rapid curing, highly desirable for a molding compound. The cured disc has excellent appearance and a hot rigidity of 57 mils (well below the conventional 100 mils cut-off limit for such compounds).

EXAMPLE IV

The process of Example I, Sample B is repeated except t-butyl perbenzoate is utilized instead of dicumyl peroxide. The resultant composition has a gel time of 1.4 minute at 175° C. and a hot rigidity of 50 mils.

EXAMPLE V

The process of Example I, Sample B is repeated except t-butyl isopropyl monoperoxycarboante is utilized instead of dicumyl peroxide. The resultant composition has a gel time of 1.6 minute at 175° C. and is cured into a hard part.

EXAMPLE VI

The process of Example I, Sample B is repeated however 1,1-di(t-butylperoxy) 3,3,5-trimethylcyclohexane is utilized instead of dicumyl peroxide. The resultant composition has a gel time of 2.7 minutes at 175° C. and cures into a soft part at 175° C.

EXAMPLE VII

The following are mixed together by roll milling for 2 minutes after flux at 65° C.:

| | |
|---|---|
| 100 grams | solid epoxy novolac resin |
| 2 grams | diphenyl iodonium hexafluroarsenate |
| 2 grams | dicumyl peroxide |
| 300 grams | silica |

This composition is sheeted, chopped and then compression molded into a ⅛ inch by 4 inch disc at 175° C. It cures within 4 minutes.

The gel time of the molding composition is 0.14 minutes at 150° C. and 0.06 minutes at 175° C. The cured disc has a hot rigidity of 6 mils and a hot shore D hardness of 90.

The disclosures of the patents, patent applications and publications mentioned above are incorporated herein by reference. Obviously, many modifications and variations of the present invention are possible in the light of the above and other well-known teachings. It is therein to be understood that changes may be made in the particularly described embodiments of this invention. All are within the full intended scope of the invention as defined in the appended claims.

I claim:

1. A molding compound comprising:
   (a) from about 5 to 90% by weight of curable epoxy resin;
   (b) from about 0.01 to 10% by weight of an aromatic onium salt of the formula:

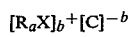

wherein each R is a monovalent organic aromatic radical; X is selected from the group consisting of sulfur and iodine; C is a lewis acid polymerization catalyst precursor; a equals the absolute value of the valence number of (X minus 1); and b equals the absolute value of the valence number of C;
   (c) from about 0.01 to 10% by weight of peroxide compound effective to activate said catalyst; and
   (d) from about 10 to 95% by weight of filler, based on the total weight of the composition.

2. The molding compound of claim 1, wherein the peroxide compound is an organic compound present in an amount which is at least 10% by weight of the aromatic onium salt.

3. The molding compound of claim 1, wherein the filler comprises a fibrous material.

4. The molding compound of claim 1, wherein the filler comprises from about 50 to 95% by weight.

5. The molding compound of claim 1, wherein the epoxy resin comprises from about 5 to 50% by weight.

6. The molding compound of claim 1, wherein the onium salt and peroxide compound comprise a total of from 1 to 10% by weight based on epoxy resin.

7. A molding compound comprising:
   (a) from about 5 to about 90% by weight of a curable epoxy resin consisting essentially of bisphenol A diglycidyl ether epoxy resin;
   (b) from about 0.01 to 10% by weight of an aromatic onium salt consisting essentially of diphenyliodonium hexafluoroarsenate;
   (c) from about 0.01 to 10% by weight of a peroxide compound effective to activate said catalyst, said peroxide consisting essentially of dicumyl peroxide; and
   (d) from about 10 to 95% by weight of a filler consisting essentially of silica, all of the foregoing being based on the total weight of the composition.

* * * * *